2,848,478
Patented Aug. 19, 1958

2,848,478

3-HYDROCARBO-2-CYCLOBUTENE-1,2-DICARBOXYLIC ACIDS AND THEIR PREPARATION

Burt C. Pratt, Indianfield, Del., assignor to E. I. du Pont de Nemours and Company, Wilmington, Del., a corporation of Delaware No Drawing. Application December 16, 1955
Serial No. 553,417

12 Claims. (Cl. 260—468)

This invention relates to new cyclic unsaturated dicarboxylic acids and derivatives hydrolyzable thereto, and to methods for their preparation.

Dicarboxylic acids and their derivatives are used commercially in large quantities as intermediates in the manufacture of condensation polymers, e. g., polyesters and polyamides, and in the manufacture of plasticizers for cellulose derivatives and synthetic polymers. In these different applications, various dicarboxylic acids are empolyed since the particular properties of the final products are influenced by the particular structures of the dicarboxylic acids employed.

This invention has as an object the provision of a process for the preparation of new dicarboxylic acids. A further object is the class of new dicarboxylic acids thus prepared. Another object is the preparation of new polymers.

These objects are accomplished by the present invention of 3-hydrocarbo-2-cyclobutene-1,2-dicarboxylic acids, the functional derivatives thereof hydrolyzable thereto and of the process for the preparation of said acids wherein 3-alkylidene-(or 3-aralkylidene-)1,2-cyclobutanedicarboxylic anhydrides having at least one hydrogen atom on the carbon of the alkylidene or aralkylidene group attached to the cyclobutane ring are rearranged by bringing the same in contact with aqueous alkali followed by acidification.

The novel acids of the present invention are 3-hydrocarbo-2-cyclobutene-1,2-dicarboxylic acids of the general formula

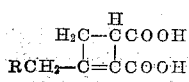

wherein R is hydrogen, alkyl, cycloalkyl, or aryl. The hydrolyzable derivatives include the salts, esters, amides, and acid halides of these cyclobutenedicarboxylic acids.

The rearrangement process of the present invention is conveniently carried out by treating a 3-alkylidene-(or 3-aralkylidene-)cyclobutane-1,2-dicarboxylic anhydride (or the free acid) with an aqueous solution or suspension of a base, i. e., one having a pH in aqueous solution or suspension of more than 7.5, at ordinary or elevated temperatures. Suitable bases include alkali metal hydroxides, e. g., sodium hydroxide, quaternary ammonium hydroxides, e. g., benzyltrimethylammonium hydroxide, basic salts, e. g., potassium cyanide, and basic ion exchange resins. Preferably the rearrangement is carried out at temperatures of 70° C.–120° C., since at these temperatures the rearrangement takes place at a more practical rate. It is convenient to carry out the rearrangement at the reflux temperature of the reaction system. The time of treatment varies with the operating temperatures. At temperatures of 70° C.–120° C. reaction times of one-half to one hour are usually sufficient, although longer times are not harmful. At lower temperatures reaction times of several hours are required. The amount of base employed in the process of this invention is that slightly in excess of the theoretical quantity equivalent to the dicarboxylic anhydride being treated. A 1% excess is satisfactory, although larger amounts, e. g., 5–10% excess, can be used if desired. The concentration of the base in the aqueous system is not critical, concentrations of 10–20%, by weight, being satisfactory. However, the concentration of the base should not be so high that the dicarboxylic acid salt formed of the unrearranged acid is precipitated out of the reaction system.

After the rearrangement of the alkylidenecyclobutanedicarboxylic anhydride is completed, the free cyclobutenedicarboxylic acid is formed by treatment of its salt with a strong mineral acid, e. g., hydrochloric, nitric, or sulfuric acid. This acidification step can be carried out at room temperature, but it is usually desirable to warm the reaction mixture so as to complete the reaction in a shorter time.

The salt of the 3-hydrocarbo-2-cyclobutene-1,2-dicarboxylic acid can be isolated by evaporating the aqueous solution containing little or no excess alkali to dryness under vacuum or by concentrating the aqueous solution and cooling to crystallize the salt.

The derivatives of the 3-hydrocarbo-2-cyclobutene-1,2-dicarboxylic acids included in this invention are prepared by conventional methods. For example, the acid chloride can be prepared by treating the 3-hydrocarbo-2-cyclobutene-1,2-dicarboxylic acid with thionyl chloride, and the acid bromide by reacting the dicarboxylic acid with phosphorus tribromide. The diesters of 3-hydrocarbo-2-cyclobutene-1,2-dicarboxylic acids can be prepared by treating the acid chloride with an alcohol, e. g., ethanol, in the presence of an acid acceptor such as triethylamine. Likewise, the diamides of 3-hydrocarbo-2-cyclobutene-1,2-dicarboxylic acids can be prepared by treatment of the acid chlorides with an amine, having hydrogen on amino nitrogen, e. g., aniline, diethylamine, and the like.

The 3-alkylidene-(or 3-aralkylidene-)cyclobutane-1,2-dicarboxylic anhydrides used as starting materials in the process of this invention are prepared by the addition of allenes of the formula

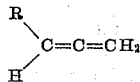

wherein R is hydrogen, alkyl, cycloalkyl, and aryl, e. g., allene, methylallene, phenylallene, cyclohexylallene, in the presence of an inert solvent e. g., benzene, to maleic anhydride at temperatures of 150° C.–250° C. in the absence of a polymerization initiator, and preferably in the presence of a polymerization inhibitor, e. g. hydroquinone.

The products and process of this invention are illustrated further by the following examples in which the proportions of ingredients are expressed in parts by weight unless otherwise specified.

Example I

A mixture of 113.5 parts of 3-methylenecyclobutane-1,2-dicarboxylic anhydride and 68 parts of sodium hydroxide dissolved in 350 parts of water is heated under reflux for four hours. The resulting solution is cooled, acidified with hydrochloric acid, heated on a steam bath for one-half hour and then cooled. The white solid that forms, 3-methyl-2-cyclobutene-1,2-dicarboxylic acid, is filtered out and washed with a small amount of cold water. The dicarboxylic acid is obtained in 84% yield (108 parts) and melts at 188° C.–189° C. Infrared absorption spectra of the product indicate that the methylene group is not present and that the double bond has shifted into conjugation with a carboxyl group.

Example II

A mixture of 149 parts of 3-methyl-2-cyclobutene-1,2-dicarboxylic acid, 850 parts of thionyl chloride, and 1 part of anhydrous zinc chloride is heated under reflux for five hours. The excess thionyl chloride is removed by distillation at atmospheric pressure and the residue is distilled under reduced pressure. The 3-methyl-2-cyclobutene-1,2-dicarbonyl chloride boils at 68–69° C./0.3 mm. of mercury and is obtained in 87% yield (160 parts). Nuclear magnetic resonance data that the double bond in the diacid chloride has the position shown in the following formula:

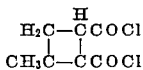

Example III

One part of 3-methyl-2-cyclobutene-1,2-dicarbonyl chloride is added to 1 part of aniline. A reaction occurs with the evolution of heat. After the reaction subsides, the mixture is heated in a steam bath for ten minutes. The addition of water to the reaction mixture causes the precipitation of a white solid. This solid is 3-methyl-2-cyclobutene-1,2-dicarboxanilide, and after recrystallization from benzene it melts at 185° C.–186° C.

*Analysis.*—Calculated for $C_{19}H_{18}O_2N_2$: C, 74.49%; H, 5.92%; N, 9.15%. Found: C, 74.40%; H, 5.98%; N, 8.93%.

Example IV

Twenty parts of 3-methyl-2-cyclobutene-1,2-dicarbonyl chloride is added dropwise to a solution containing 10 parts of methyl alcohol and 23.3 parts of triethylamine. When the addition is complete, the mixture is stirred at room temperature for one-half hour. Diethyl ether is added and the amine salt that precipitates is filtered out. The filtrate is distilled and there is obtained 13 parts of dimethyl 3-methyl-2-cyclobutene-1,2-dicarboxylate boiling at 58° C./0.20 mm. of mercury and having a refractive index, $n_D^{25}$, of 1.4688.

In addition to 3-methyl-2-cyclobutenedicarboxylic acid and the specific derivatives illustrated by the examples, the products of this invention include other 3-hydrocarbo-2-cyclobutene-1,2-dicarboxylic acids and derivatives hydrolyzable thereto. Thus, the hydrocarbon radical in the 3-position can be any monovalent hydrocarbon radical free from aliphatic unsaturation in which the carbon attached to the cyclobutene ring has at least two hydrogen atoms joined to it. Specific examples of the products included are 3-ethyl-, 3-n-butyl-, 3-n-hexyl-, 3-n-decyl-, 3-n-octadecyl-, 3-phenylmethyl-, 3-p-tolylmethyl-, and 3-cyclohexylmethyl-2-cyclobutene-1,2-dicarboxylic acids.

The products of this invention also include the salts of these various acids with sodium, potassium, and other metals, e. g., barium, calcium, cobalt, lead, copper, and iron. The alkali metal salts can be prepared as described above. The other metal salts, particularly of polyvalent metals, can be prepared by simple metathesis between an aqueous solution of an alkali metal salt and an aqueous solution of a salt of the appropriate metal. The invention also includes the esters of these acids with alcohols and phenols, e. g., ethanol, butanol, phenol, etc.; amides of these acids, e. g., with ammonia, methylamine, diethylamine, aniline, and the like; and the acid halides, e. g., fluorides, chlorides, and bromides.

The rearrangement of the double bond in the 3-alkylidene-(or aralkylidene-)cyclobutane-1,2-dicarboxylic acids and anhydrides under the conditions of this invention is unexpected because the reaction gives a product that has a strained ring. The process of this invention provides an easy method for preparing cyclobutenedicarboxylic acids having the double bond of the cyclobutene ring in conjugation with the double bond in one of the carboxyl groups. This process is much more readily carried out than known processes for preparing cyclobutenedicarboxylic acids hitherto known which have the double bond in a different position with respect to the carboxyl groups.

The free 3-hydrocarbo-2-cyclobutene-1,2-dicarboxylic acids of this invention are readily converted to the diacid chloride by treatment with thionyl chloride. The diacid chloride can be reacted with alcohol, ammonia, or amines to form ester and amide plasticizers for use with cellulose derivatives, e. g., cellulose acetate and in the preparation of new thermosetting polymers, i. e., polymers which are readily crosslinkable by heat. Thus, 3-methyl-2-cyclobutene, 1,2-dicarbonyl chloride 4 parts, polyvinyl alcohol 10 parts, and triethylamine 4.5 parts, stirred in chloroform for four hours at room temperature gives a water-soluble polymer, a film from which pressed at 250° C. and 550 lbs./sq. in. is insoluble in water.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A member of the class consisting of 3-hydrocarbo-2-cyclobutene-1,2-dicarboxylic acids and, salts, esters, amides, and acid halides thereof, wherein the hydrocarbo substituent is a monovalent hydrocarbon radical free from aliphatic unsaturation in which the carbon atom attached to the cyclobutene ring has at least two hydrogen atoms joined to it.

2. A 3-hydrocarbo-2-cyclobutene-1,2-dicarboxylic acid, wherein the hydrocarbo substituent is a monovalent hydrocarbon radical free from aliphatic unsaturation in which the carbon atom attached to the cyclobutene ring has at least two hydrogen atoms joined to it.

3. A 3-primary alkyl-2-cyclobutene-1,2-dicarboxylic acid.

4. 3-Methyl-2-cyclobutene-1,2-dicarboxylic acid.

5. A salt of 3-methyl-2-cyclobutene-1,2-dicarboxylic acid.

6. A 3-methyl-2-cyclobutene-1,2-dicarboxylic acid halide.

7. An easter of 3-methyl-2cyclobutene-1,2-dicarboxylic acid.

8. An amide of 3-methyl-2-cyclobutene-1,2-dicarboxylic acid.

9. Process which comprises bringing in contact with a base a cyclobutane-1,2-dicarboxylic anhydride having the 3 carbon joined by a double bond to open-chain hydrogen-bearing carbon of a hydrocarbon radical free from aliphatic unsaturation, the amount of base employed being slightly in excess of the theoretical quantity equivalent to the dicarboxylic anhydride.

10. Process which comprises bringing in contact with a base a 3-alkylidenecyclobutane-1,2-dicarboxylic anhydride.

11. Process which comprises bringing in contact with a base 3-methylenecyclobutane-1,2-dicarboxylic anhydride.

12. Process which comprises bringing in contact with a base a cyclobutane-1,2-dicarboxylic anhydride having the 3 carbon joined by a double bond to open chain, hydrogen-bearing carbon of a hydrocarbon radical and acidifying the resulting product to form the free acid.

References Cited in the file of this patent

UNITED STATES PATENTS 2,365,703    Jahn _____ Dec. 26, 1944

OTHER REFERENCES

Beilstein, IX, 769 (1926).
Ryder: Chem. Abst. 30, 5209 (1936).
Hickinbottom: "Reactions of Organic Compounds," page 43 (1948).

UNITED STATES PATENT OFFICE
CERTIFICATE OF CORRECTION

Patent No. 2,848,478                                    August 19, 1958

Burt C. Pratt

It is hereby certified that error appears in the printed specification of the above numbered patent requiring correction and that the said Letters Patent should read as corrected below.

Column 3, line 7, after "data" insert -- indicate --; column 4, line 64, before "and" insert -- free from aliphatic unsaturation, the amount of base employed being slightly in excess of the theoretical quantity equivalent to the dicarboxylic anhydride --.

Signed and sealed this 11th day of November 1958.

(SEAL)

Attest:

KARL H. AXLINE                                              ROBERT C. WATSON

Attesting Officer                                          Commissioner of Patents